(12) United States Patent
Hu et al.

(10) Patent No.: US 10,448,043 B2
(45) Date of Patent: Oct. 15, 2019

(54) MOTION ESTIMATION METHOD AND MOTION ESTIMATOR FOR ESTIMATING MOTION VECTOR OF BLOCK OF CURRENT FRAME

(71) Applicant: NOVATEK Microelectronics Corp., Hsin-Chu (TW)

(72) Inventors: Pengyuan Hu, Xi'an (CN); Xi Tian, Xi'an (CN); Yen-Sung Chen, New Taipei (TW); Yuanjia Du, Jianan (CN)

(73) Assignee: NOVATEK Microelectronics Corp., Hsin-Chu (TW)

( * ) Notice: Subject to any disclaimer, the term of this patent is extended or adjusted under 35 U.S.C. 154(b) by 255 days.

(21) Appl. No.: 15/391,864

(22) Filed: Dec. 28, 2016

(65) Prior Publication Data

US 2018/0184106 A1 Jun. 28, 2018

(51) Int. Cl.
| | |
|---|---|
| *H04N 19/52* | (2014.01) |
| *H04N 19/513* | (2014.01) |
| *H04N 19/105* | (2014.01) |
| *H04N 19/14* | (2014.01) |
| *H04N 19/56* | (2014.01) |
| *H04N 19/176* | (2014.01) |
| *H04N 19/172* | (2014.01) |

(52) U.S. Cl.
CPC ......... *H04N 19/513* (2014.11); *H04N 19/105* (2014.11); *H04N 19/14* (2014.11); *H04N 19/56* (2014.11); *H04N 19/172* (2014.11); *H04N 19/176* (2014.11); *H04N 19/52* (2014.11)

(58) Field of Classification Search
CPC .... H04N 19/513; H04N 19/105; H04N 19/14; H04N 19/172; H04N 19/176
USPC ................................................... 375/240.16
See application file for complete search history.

(56) References Cited

U.S. PATENT DOCUMENTS

2010/0328538 A1* 12/2010 Al-Kadi ................. H04N 5/145
348/699

\* cited by examiner

*Primary Examiner* — Ayman A Abaza
(74) *Attorney, Agent, or Firm* — Winston Hsu

(57) ABSTRACT

A motion estimation method and a motion estimator are provided. The motion estimation method includes the following steps of for each respective block of the current frame, selecting a candidate set associated with the current frame and a previous frame, and determining a motion vector according to the candidate set for the each respective block of the current frame. The candidate set includes at least one spatial candidate block in the current frame and temporal candidate blocks in the previous frame. The step of selecting the candidate set includes: selecting the spatial candidate block directly adjacent to the each respective block from the current frame and selecting the plurality of temporal candidate blocks directly adjacent to a reference block from the previous frame.

18 Claims, 9 Drawing Sheets

MOTION ESTIMATION METHOD AND MOTION ESTIMATOR FOR ESTIMATING MOTION VECTOR OF BLOCK OF CURRENT FRAME

BACKGROUND OF THE INVENTION

1. Field of the Invention

The present invention relates to a motion estimation method and a motion estimator, and more particularly, to a motion estimation method and a motion estimator suitable for parallel processing.

2. Description of the Prior Art

Motion estimation is an important technique in video compression, its objective being to determine a motion vector using a correlation between a previous and subsequent frame, and to obtain the subsequent image frame accordingly, thereby reducing redundancy information in each image frame at different times. A video is a series of image frames played back consecutively, and its primary working principle is to create an illusion of animation via transient visual persistence of the subtle variations between neighboring image frames. Generally, neighboring frames exhibit a strong correlation with each other in time and space, and usually have portions that are similar or identical to each. Therefore, when storing or transmitting image frames, the identical parts without variation do not need to be stored. After recording previous frames, a subsequent frame may be reconstructed using the stored previous frame and information recorded during the object motion process. In other words, during video encoding/decoding, not all of the frame information needs to be processed, thereby effectively reducing transmission throughput, and achieving video compression.

Block matching is a common method for calculating a motion vector, in which an image frame is divided into multiple non-overlapping blocks, and similar portions in each block at different times are identified to obtain the motion vector information for each block. Three Dimensional Recursive Search (3DRS) is one of the motion estimation methods based on spatial and temporal dependency of frames. Please refer to FIG. 1, which is a schematic diagram of a candidate set of the conventional 3DRS motion estimation. The conventional 3DRS motion estimation method calculates a motion vector of a current block 102 in a current frame by using the motion vectors of a candidate set. As shown in FIG. 1, the candidate set includes a spatial candidate block 104 which is an upper left block of the current block 102 in the current frame, a spatial candidate block 106 which is an upper right block of the current block 102 in the current frame and temporal candidate blocks 108 and 110 in previous frame. As shown in FIG. 1, the conventional 3DRS algorithm can only be paralleled in horizontal row direction due to the fact that when estimating the motion vector of the current block 102, the computing process of the spatial candidate block 104 (i.e. its upper left neighbor and the spatial candidate block 106 (i.e. upper right neighbor) must be finished. Thus, it is difficult to apply an effective parallelization processing for implementation.

SUMMARY OF THE INVENTION

It is therefore an objective of the present invention to provide a motion estimation method and a motion estimator suitable for parallel processing.

The present invention discloses a motion estimation method for estimating motion vectors of blocks of a current frame, comprising: for each respective block of the current frame, selecting a candidate set associated with the current frame and a previous frame, the candidate set comprising at least one spatial candidate block in the current frame and a plurality of temporal candidate blocks in the previous frame, wherein the step of selecting the candidate set comprises: selecting the at least one spatial candidate block directly adjacent to the each respective block from the current frame, wherein the at least one spatial candidate block is located in the same row or column of the current frame as the each respective block; and selecting the plurality of temporal candidate blocks directly adjacent to a reference block from the previous frame, wherein the reference block spatially corresponds to the each respective block in the previous frame, and the plurality of temporal candidate blocks are located in the same row or column of the previous frame as the reference block; and determining a motion vector according to the candidate set for the each respective block of the current frame.

The present invention further discloses a motion estimator for estimating motion vectors of blocks of a current frame, comprising: a candidate set generation unit, for selecting a candidate set associated with the current frame and a previous frame for each respective block of the current frame, wherein the candidate set comprises at least one spatial candidate block in the current frame and a plurality of temporal candidate blocks in the previous frame; and a motion vector determination unit, for determining a motion vector according to the candidate set for the each respective block of the current frame; wherein the candidate set generation unit selects the at least one spatial candidate block directly adjacent to the each respective block from the current frame, wherein the at least one spatial candidate block is located in the same row or column of the current frame as the each respective block, and the candidate set generation unit selects the plurality of temporal candidate blocks directly adjacent to a reference block from the previous frame, wherein the reference block spatially corresponds to the each respective block in the previous frame, and the plurality of temporal candidate blocks are located in the same row or column of the previous frame as the reference block.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, if one device is coupled to another device, that connection may be through a direct electrical connection, or through an indirect electrical connection via other devices and connections.

Figure 1:
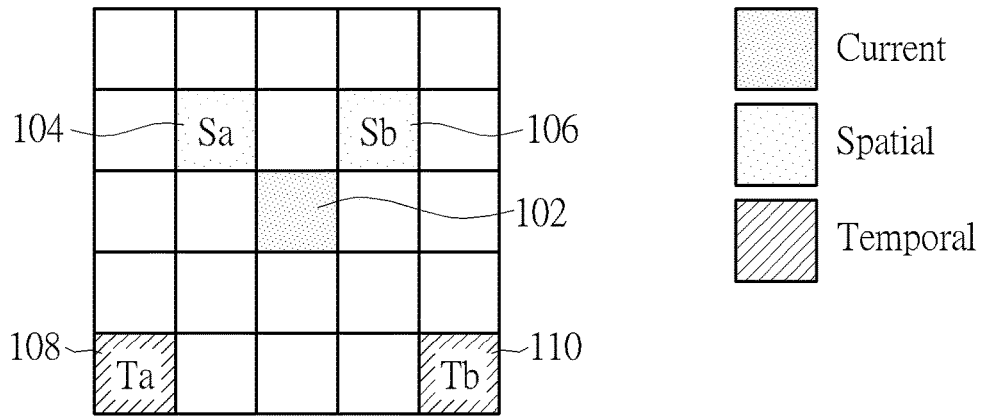
FIG. 1 is a schematic diagram of a candidate set of the conventional 3DRS motion estimation.
Figure 2:
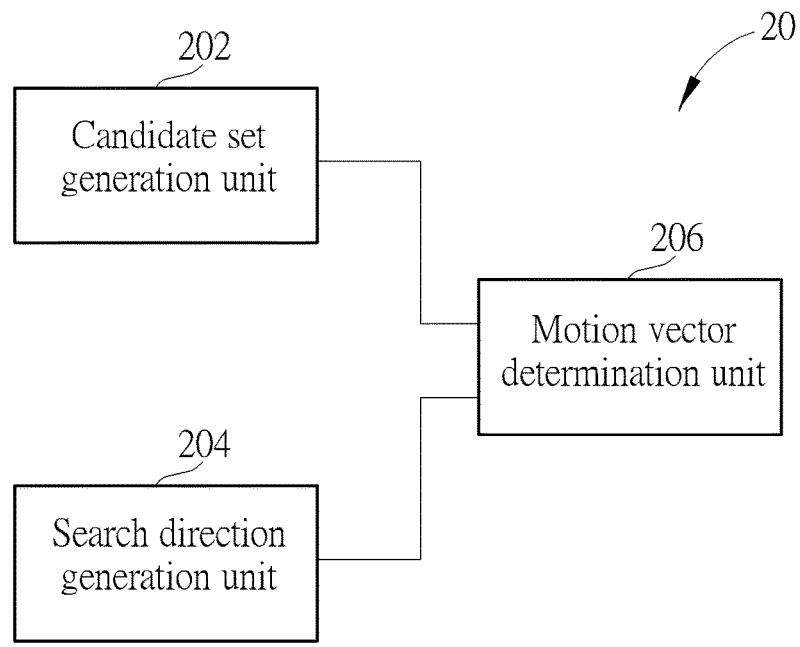
FIG. 2 is a schematic diagram of a motion estimator according to an exemplary embodiment of the invention.

Please refer to FIG. 2, which is a schematic diagram of a motion estimator 20 according to an embodiment of the invention. For illustration purposes, assume a video signal includes a plurality of frames. Each frame is divided into a plurality of blocks arranged in rows and columns. Each block includes one or more pixels. The motion estimator 20 is utilized for estimating motion vectors of blocks of each frame. The motion estimator 20 includes a candidate set generation unit 202, a search direction generation unit 204 and a motion vector determination unit 206. The candidate set generation unit 202 is utilized for selecting a candidate set associated with a current frame and a previous frame for each respective block of the current frame. For each respective block of the current frame, the candidate set may include at least one spatial candidate block in the current frame and a plurality of temporal candidate blocks in the previous frame. The search direction generation unit 204 is utilized for selecting a search direction according to the candidate set. The motion vector determination unit 206 is utilized for determining the motion vectors of the blocks of the current frame according to the search direction and determining respective motion vector according to the respective candidate set for each respective block in the current frame.

Figure 3:
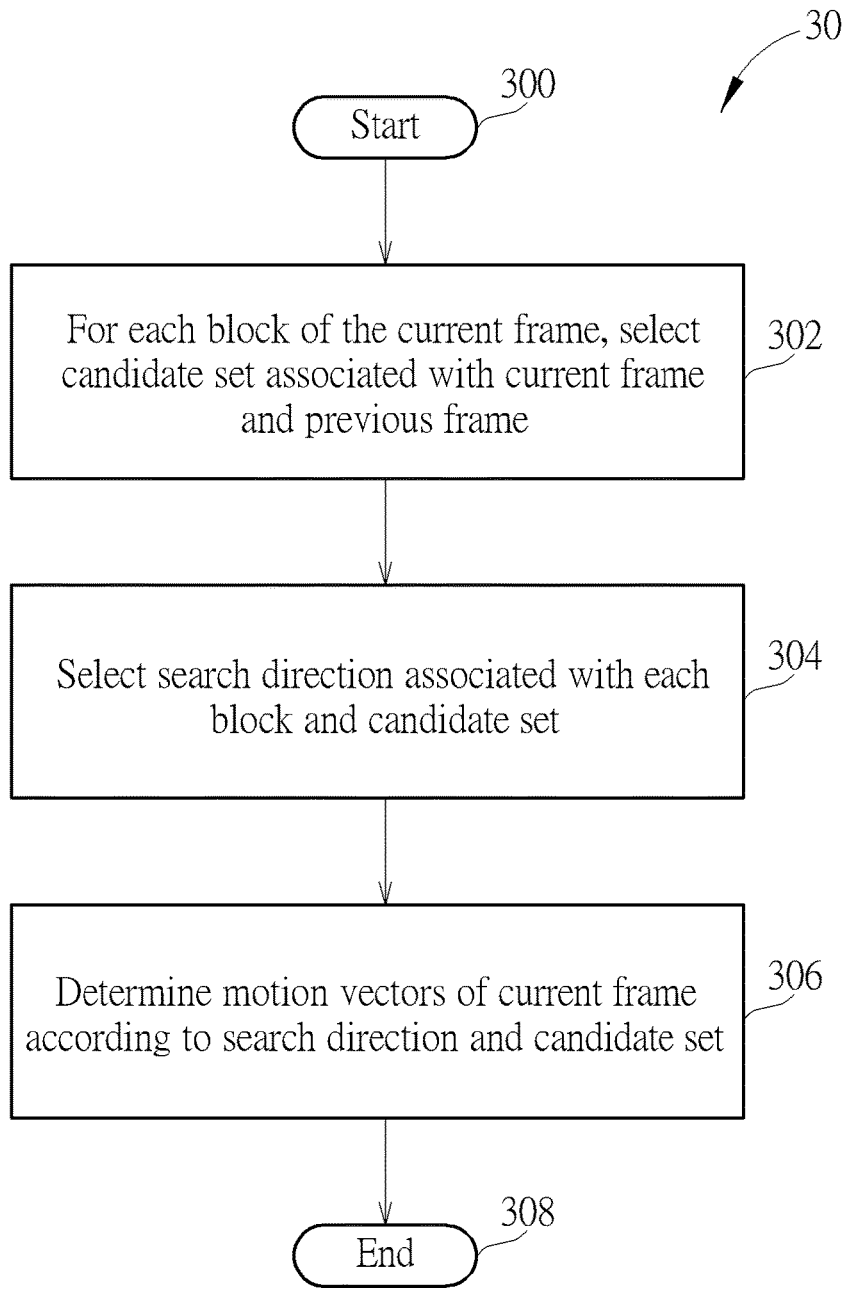
FIG. 3 is a schematic diagram of a procedure according to an exemplary embodiment of the invention.

For an illustration of the operations of the motion estimator 20, please refer to FIG. 3. Please refer to FIG. 3, which is a schematic diagram of a procedure 30 according to an exemplary embodiment of the invention. The procedure 30 can estimate the motion vector for each block. The procedure 30 in FIG. 3 mainly corresponds to the operations on the motion estimator 20 shown in FIG. 2. Please note that those skilled in the art will should observe that the method shown in FIG. 3 can include other intermediate steps or several steps can be merged into a single step. The procedure 30 can include the following steps:

Step 300: Start.
Step 302: For each block of the current frame, select candidate set associated with current frame and previous frame.
Step 304: Select search direction associated with each block and candidate set.
Step 306: Determine motion vectors of current frame according to search direction and candidate set.
Step 308: End.

According to the procedure 30, motion vectors of blocks corresponding to the current frame can be estimated. In Step 302, for each respective block of the current frame, the candidate set generation unit 202 selects a candidate set associated with the current frame and a previous frame. The candidate set of the each respective block may include at least one spatial candidate block in the current frame and a plurality of temporal candidate blocks in the previous frame.

In an embodiment, the candidate set generation unit 202 selects at least one spatial candidate block directly adjacent to each respective block from the current frame. Each spatial candidate block may be located in the same row or column of the current frame as the each respective block. The candidate set generation unit 202 selects a plurality of temporal candidate blocks directly adjacent to a reference block from the previous frame. The reference block is located on the previous frame and spatially corresponds to the each respective block of the current frame. That is, the reference block of the previous frame is at a same position with the each respective block of the current frame. A relationship of the at least one spatial candidate block and the plurality of temporal candidate blocks may include at least one of the following: (a) When the at least one spatial candidate block is located in the same row of the current frame as the each respective block, the plurality of temporal candidate blocks are located in the same column of the previous frame as the reference block; (b) When the at least one spatial candidate block is located in the same column of the current frame as the each respective block, the plurality of temporal candidate blocks are located in the same row of the previous frame as the reference block.

For example, please refer to FIGS. 4-7, which are schematic diagrams of the candidate set according to embodiments of the invention. As show in FIG. 4, a candidate set CSa is chosen for a current block 402. The candidate set CSa includes a spatial candidate block 404, temporal candidate blocks 406 and 408. A reference block 410 is located on the previous frame and spatially corresponds to the current block 402 of the current frame. The spatial candidate block 404 is adjacent to the left edge of the current block 402. The temporal candidate blocks 406 and 408 are respectively adjacent to the top edge and the bottom edge of the reference block 410. The motion vector of the spatial candidate block 404 in the current frame and the motion vectors of the temporal candidate blocks 406 and 408 may be estimated before determining the motion vector of the current block 402. As such, since the spatial candidate block 404 and the temporal candidate blocks 406 and 408 of the candidate set CSa are selected, the motion vectors of the spatial candidate block 404 and the temporal candidate blocks 406 and 408 can be used as candidate motion vectors for the current block.

Figure 5:
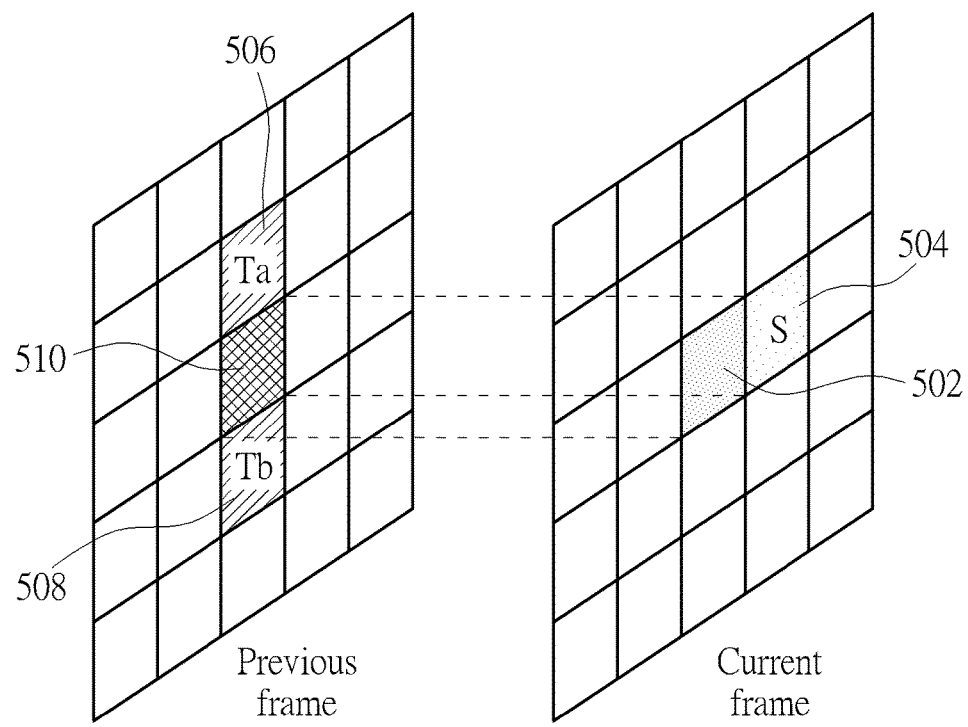

As show in FIG. 5, a candidate set CSb is chosen for a current block 502. The candidate set CSb includes a spatial candidate block 504, temporal candidate blocks 506 and 508. A reference block 510 is located on the previous frame and spatially corresponds to the current block 502 of the current frame. The spatial candidate block 504 is adjacent to the right edge of the current block 502. The temporal candidate blocks 506 and 508 are respectively adjacent to the top edge and the bottom edge of the reference block 510. Similarly, the motion vectors of the spatial candidate block 504 and the temporal candidate blocks 506 and 508 can be used as candidate motion vectors for the current block 502.

Figure 6:
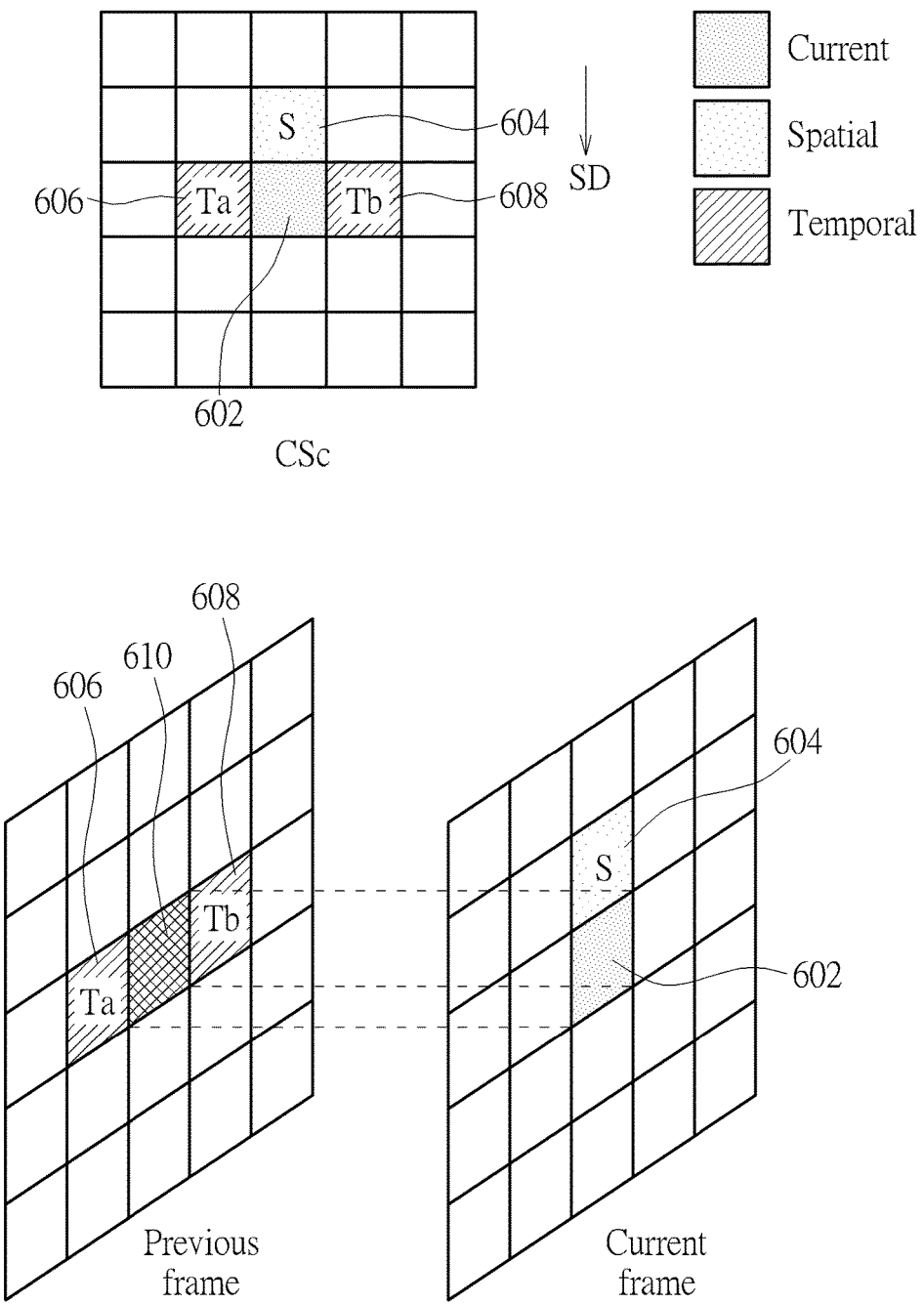

As show in FIG. 6, a candidate set CSc is chosen for a current block 602. The candidate set CSc includes a spatial candidate block 604, temporal candidate blocks 606 and 608. A reference block 610 is located on the previous frame and spatially corresponds to the current block 602 of the current frame. The spatial candidate block 604 is adjacent to the top edge of the current block 602. The temporal candidate blocks 606 and 608 are respectively adjacent to the left edge and the right edge of the reference block 610. Similarly, the motion vectors of the spatial candidate block 604 and the temporal candidate blocks 606 and 608 can be used as candidate motion vectors for the current block 602.

Figure 7:
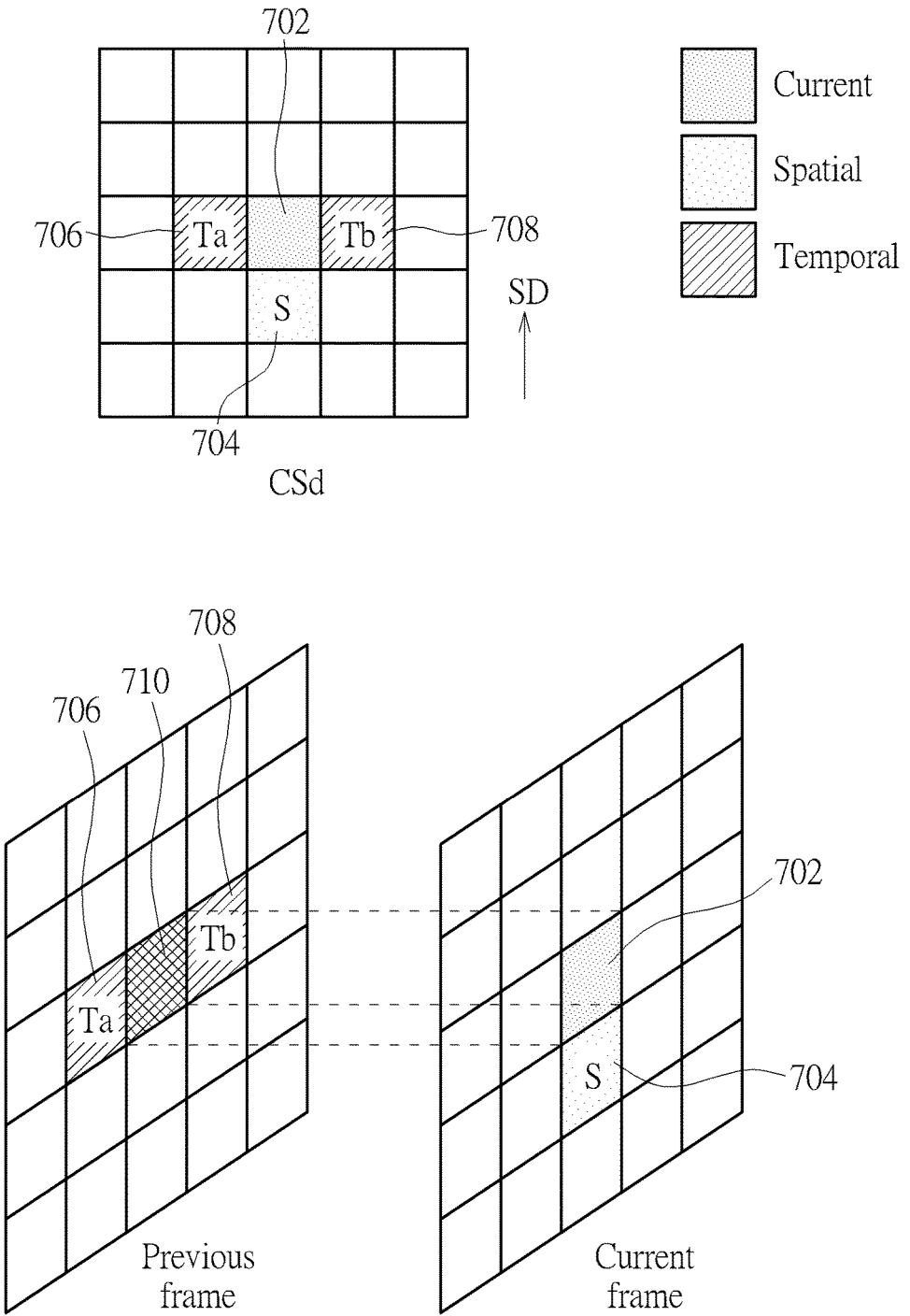

As show in FIG. 7, a candidate set CSd is chosen for a current block 702. The candidate set CSd includes a spatial candidate block 704, temporal candidate blocks 706 and 708. A reference block 710 is located on the previous frame and spatially corresponds to the current block 702 of the current frame. The spatial candidate block 704 is adjacent to the bottom edge of the current block 702. The temporal candidate blocks 706 and 708 are respectively adjacent to the left edge and the right edge of the reference block 610. Similarly, the motion vectors of the spatial candidate block 704 and the temporal candidate blocks 706 and 708 can be used as candidate motion vectors for the current block 702.

In Step 304, the search direction generation unit 204 selects a search direction according to the candidate set for estimating motion vectors of the current frame. The search direction may be associated with the respective block and the spatial candidate block of the candidate set. In an embodiment, the search direction is a direction from the corresponding spatial candidate block of the candidate set to the respective block. For example, as show in FIG. 4, a search direction SD from left to right may be selected by the search direction generation unit 204 when the spatial candidate block 404 is adjacent to the left edge of the current block 402. Similarly, as show in FIG. 5, a search direction SD from right to left may be selected by the search direction generation unit 204 when the spatial candidate block 504 is adjacent to the left edge of the current block 502. As show in FIGS. 6-7, a search direction SD may be selected respectively based on the locations of the respective spatial candidate block and the respective current block.

Figure 4:
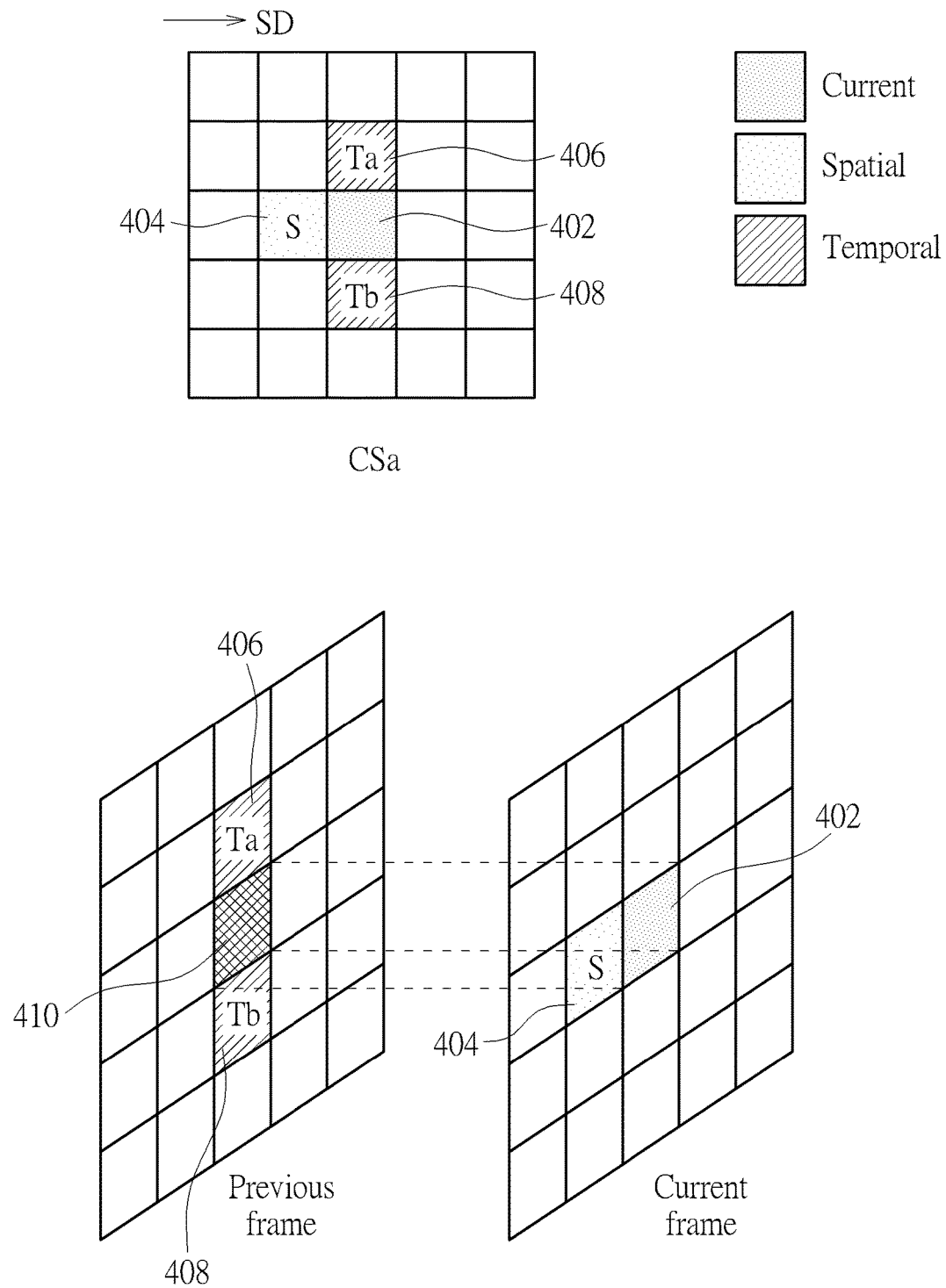
FIGS. 4-7 are schematic diagrams of the candidate set according to exemplary embodiments of the invention.

On the other hand, the search direction generation unit 204 may select a search direction, and then the candidate set generation unit 202 may select a candidate set based on the search direction selected by the search direction generation unit 204. For example, when the search direction generation unit 204 selects a left-to-right direction as the search direction, the candidate set generation unit 202 selects the candidate set CSa as shown in FIG. 4 based on the selected search direction.

Figure 8:
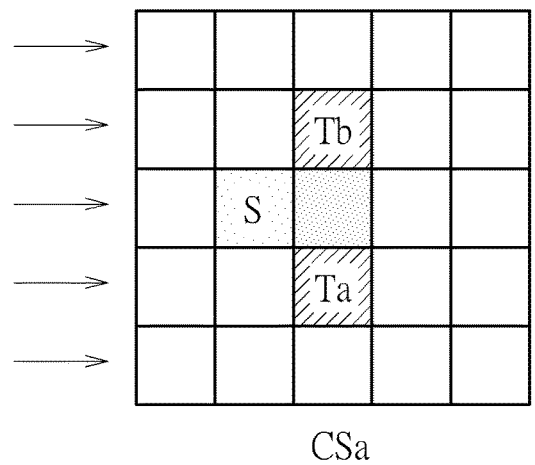
FIGS. 8-11 are schematic diagrams representing the search direction according to exemplary embodiments of the invention.

In Step 306, the motion vector determination unit 206 determines the motion vectors of the current frame according to the search direction selected by the search direction generation unit 204 and determines the respective motion vector according to the respective candidate set selected by the candidate set generation unit 202 for each respective block. For the current frame, the motion vector determination unit 206 may determine the motion vectors of the current frame in the search direction selected by the search direction generation unit 204. For example, please refer to FIG. 8, since the search direction and the candidate set CSa as shown in FIG. 4 are selected, the motion vector determination unit 206 sequentially determines the motion vectors of the blocks from left to right. When estimating the motion vectors for the first row of the current frame, the motion vector determination unit 206 sequentially determines the motion vectors of blocks on the first row (i.e. from the first block of the first row to the last block of the first row). Such like this, when estimating the motion vectors for the second row of the current frame, the motion vector determination unit 206 sequentially determines the motion vectors of blocks on the second row (i.e. from the first block of the second row to the last block of the second row).

Figure 9:
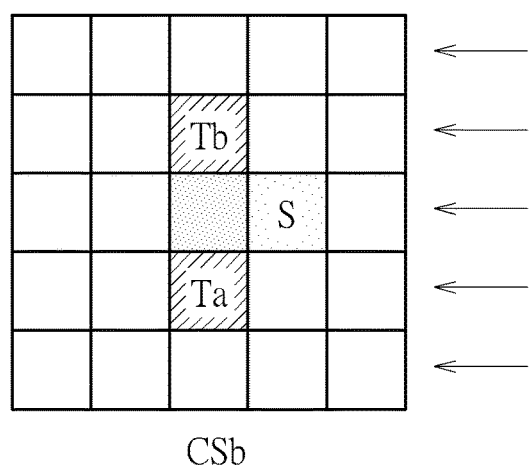
Figure 10:
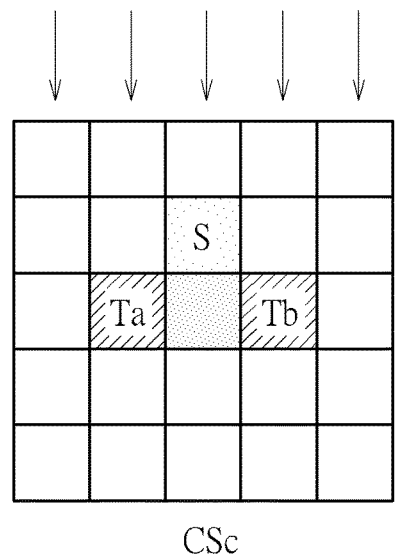
Figure 11:
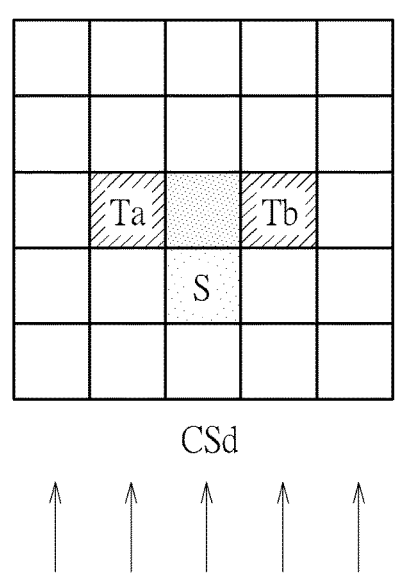

In a similar manner, please refer to FIG. 9, since the search direction and the candidate set CSb as shown in FIG. 5 are selected, the motion vector determination unit 206 sequentially determines the motion vectors of the blocks from right to left. When estimating the motion vectors for each row of the current frame, the motion vector determination unit 206 sequentially determines the motion vectors of blocks on a respective row (i.e. from the last block of respective row to the first block of the respective row). Please refer to FIG. 10, since the search direction and the candidate set CSc as shown in FIG. 6 are selected, the motion vector determination unit 206 sequentially determines the motion vectors of the blocks from top to bottom. When estimating the motion vectors for the first column of the current frame, the motion vector determination unit 206 sequentially determines the motion vectors of blocks on the first column (i.e. from the first block of the first column to the last block of the first column). Such like this, when estimating the motion vectors for the second column of the current frame, the motion vector determination unit 206 sequentially determines the motion vectors of blocks on the second column (i.e. from the first block of the second column to the last block of the second column). Please refer to FIG. 11, since the search direction and the candidate set CSd as shown in FIG. 7 are selected, the motion vector determination unit 206 sequentially determines the motion vectors of the blocks from bottom to top. When estimating the motion vectors for a respective column of the current frame, the motion vector determination unit 206 sequentially determines the motion vectors of blocks on the respective column (i.e. from the last block of the respective column to the first block of the respective column).

For each block of the current frame, the motion vector determination unit 206 determines the respective motion vector according to the respective candidate set. For example, please further refer to FIG. 4, when the candidate set CSa as shown in FIG. 4 is selected for the current block 402, the motion vector determination unit 206 calculates a difference value between the current block 402 and a shifted block corresponding to the current block and a motion vector of one of the spatial candidate block 404 and the temporal candidate blocks 406 and 408 of the candidate set for each candidate block of the candidate set CSa.

The difference value may be a sum-of-the-absolute difference (SAD) between pixels in the current block 402 and pixels in a shifted block corresponding to the current block 402 and the motion vector of the candidate block of the candidate set CSa. In an embodiment, for the spatial candidate block 404, the motion vector determination unit 206 calculates an SAD value SAD1 between pixels in the current block 402 and pixels in a shifted block corresponding to the current block 402 and the motion vector of the spatial candidate block 404. The shifted block corresponding to the current block 402 and the motion vector of the spatial candidate block 404 may be a block shifted by the motion vector of the spatial candidate block 404 for the current block 402. That is, the offset between the current block 402 and the shifted block corresponding to the current block 402 and the motion vector of the spatial candidate block 404 is equal to the motion vector of the spatial candidate block 404.

Moreover, the shifted block corresponding to the current block 402 and the motion vector of the spatial candidate block 404 may be in the previous frame (e.g., by using a backward motion estimation procedure) or in a frame next to the current frame (e.g., by using a forward motion estimation procedure). Since the motion vector of the spatial candidate block 404 is estimated by using the backward motion estimation procedure, the shifted block corresponding to the current block 402 and the motion vector of the spatial candidate block 404 may be located in the previous frame by shifting the position of the current block 402 according to the motion vector of the spatial candidate block 404. Since the motion vector of the spatial candidate block 404 is estimated by using the forward motion estimation procedure, the shifted block corresponding to the current block 402 and the motion vector of the spatial candidate block 404 may be located in a frame next to the current frame by shifting the position of the current block 402 according to the motion vector of the spatial candidate block 404.

Figure 12:
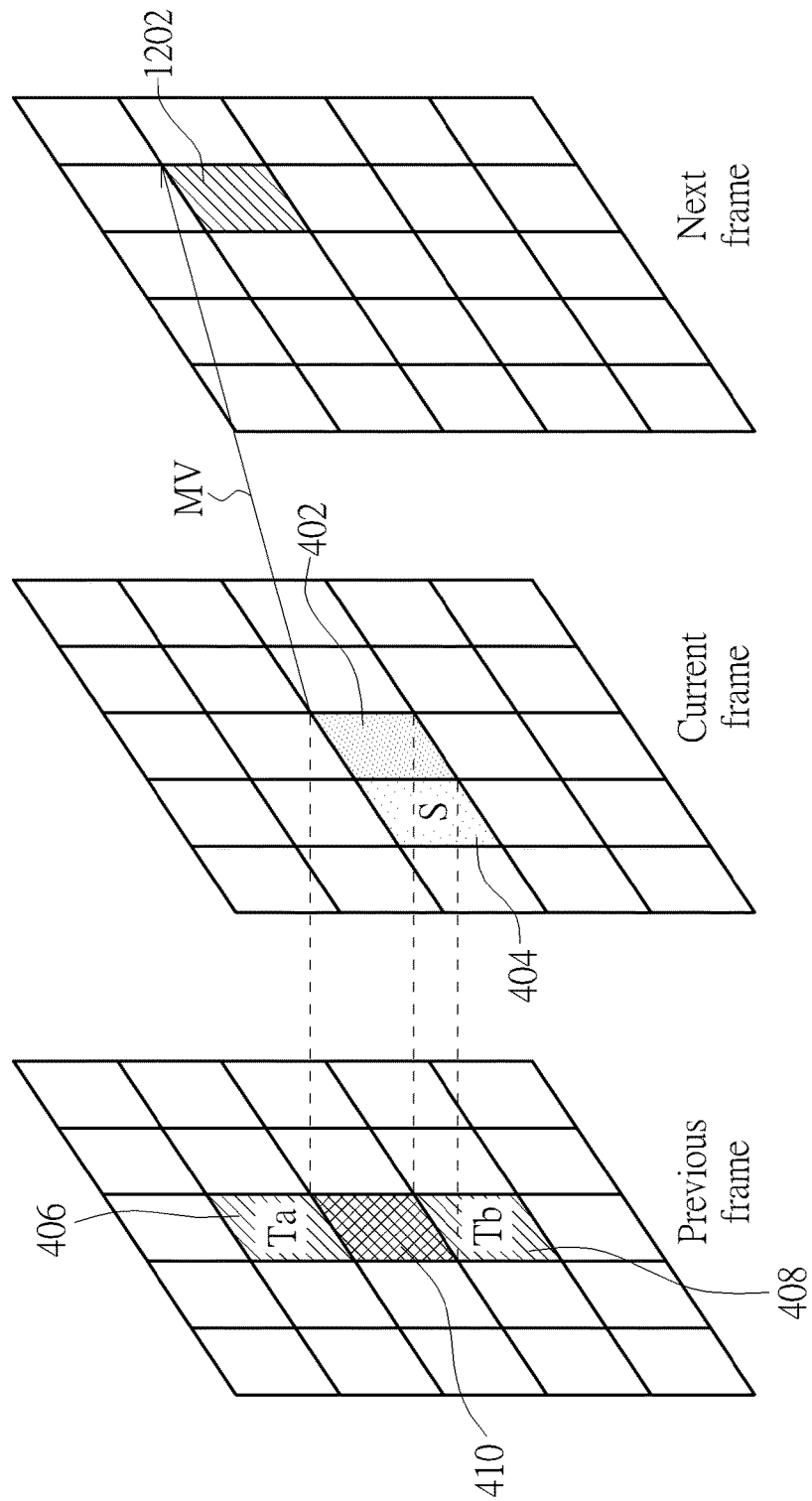
FIG. 12 is a schematic diagram representing the shifted block corresponding to the current block and the motion vector of the spatial candidate block according to an exemplary embodiment of the invention.

For example, please refer to FIG. 12 which is a schematic diagram representing the shifted block corresponding to the current block 402 and the motion vector of the spatial candidate block 404 according to an exemplary embodiment of the invention. Suppose the candidate set CSa is selected and the motion vector of the spatial candidate block 404 is estimated by using the forward motion estimation procedure. For the spatial candidate block 404, a shifted block 1202 corresponding to the current block 402 and the motion vector of the spatial candidate block 404 may be selected. As shown in FIG. 12, the shifted block 1202 is located in the next frame by shifting the position of the current block 402 with a motion vector MV of the spatial candidate block 404. Therefore, for the spatial candidate block 404, the motion vector determination unit 206 can calculate an SAD value SAD1 between pixels in the current block 402 and pixels in the shifted block 1202 corresponding to the current block 402 and the motion vector of the spatial candidate block 404.

For the temporal candidate block 406, the motion vector determination unit 206 calculates an SAD value SAD2 between pixels in the current block 402 and pixels in a shifted block corresponding to the current block 402 and the motion vector of the temporal candidate block 406. The shifted block corresponding to the current block 402 and the motion vector of the temporal candidate block 406 may be a block shifted by the motion vector of the temporal candidate block 406 for the current block 402. The offset between the current block 402 and the shifted block corresponding to the current block 402 and the motion vector of the temporal candidate block 406 is equal to the motion vector of the temporal candidate block 406. Similarly, since the motion vector of the temporal candidate block 406 is estimated by using the backward motion estimation procedure, the shifted block corresponding to the current block 402 and the motion vector of the temporal candidate block 406 may be located in the previous frame by shifting the position of the current block 402 according to the motion vector of the temporal candidate block 406. Since the motion vector of the temporal candidate block 406 is estimated by using the forward motion estimation procedure, the shifted block corresponding to the current block 402 and the motion vector of the temporal candidate block 406 may be located in a frame next to the current frame by shifting the position of the current block 402 according to the motion vector of the temporal candidate block 406.

For the temporal candidate block 408, the motion vector determination unit 206 calculates an SAD value SAD3 between pixels in the current block 402 and pixels in a shifted block corresponding to the temporal candidate block 408. The shifted block corresponding to the current block 402 and the motion vector of the temporal candidate block 408 may be a block shifted by the motion vector of the temporal candidate block 408 for the current block 402. The offset between the current block 402 and the shifted block corresponding to the current block 402 and the motion vector of the temporal candidate block 408 is equal to the motion vector of the temporal candidate block 408. Similarly, since the motion vector of the temporal candidate block 408 is estimated by using the backward motion estimation procedure, the shifted block corresponding to the current block 402 and the motion vector of the temporal candidate block 408 may be located in the previous frame by shifting the position of the current block 402 according to the motion vector of the temporal candidate block 408. Since the motion vector of the temporal candidate block 408 is estimated by using the forward motion estimation procedure, the shifted block corresponding to the current block 402 and the motion vector of the temporal candidate block 408 may be located in a frame next to the current frame by shifting the position of the current block 402 according to the motion vector of the temporal candidate block 408.

Moreover, the motion vector determination unit 206 compares with the SAD values SAD1, SAD2 and SAD3 and selects a minimum of the SAD values SAD1, SAD2 and SAD3. For example, if the SAD value SAD2 is the minimum SAD value, the motion vector determination unit 206 selects the motion vector of the temporal candidate block 406 for acting as the motion vector of the current block 402. In other words, since the motion vector of each of the spatial candidate block and the temporal candidate blocks have already been estimated during the previous procedure, the motion vectors of the spatial candidate block and the temporal candidate blocks can be used as candidate motion vectors for the current estimating block. The motion vector determination unit 206 can select one candidate block with the minimum SAD value from the corresponding candidate set and determine the motion vector of the selected candidate block as the motion vector of the current block 402.

In summary, by combining different candidate set with multiple search directions, the above-mentioned embodiments of motion estimation method and motion estimator are suitable for efficient parallel computation, thus achieving high degree of parallelism and fast convergence feature without decreasing in picture quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion estimation method for estimating motion vectors of blocks of a current frame, comprising:
    for each respective block of the current frame, selecting a candidate set associated with the current frame and a previous frame, the candidate set comprising at least one spatial candidate block in the current frame and a plurality of temporal candidate blocks in the previous frame, wherein the step of selecting the candidate set comprises:
    selecting the at least one spatial candidate block directly adjacent to the each respective block from the current frame, wherein the at least one spatial candidate block is located in the same row or column of the current frame as the each respective block; and
    selecting the plurality of temporal candidate blocks directly adjacent to a reference block from the previous frame, wherein the reference block spatially corresponds to the each respective block in the previous frame, and the plurality of temporal candidate blocks are located in the same row or column of the previous frame as the reference block; and
    determining a motion vector according to the candidate set for the each respective block of the current frame;

wherein a relationship of the at least one spatial candidate block and the plurality of temporal candidate blocks comprises one of the following:

the at least one spatial candidate block is located in the same row of the current frame as the each respective block, and the plurality of temporal candidate blocks are located in the same column of the previous frame as the reference block without located in the same row of the previous frame as the reference block; and the at least one spatial candidate block is located in the same column of the current frame as the each respective block, and the plurality of temporal candidate blocks are located in the same row of the previous frame as the reference block without located in the same column of the previous frame as the reference block.

2. The motion estimation method of claim 1, further comprising:

selecting a search direction associated with the each respective block and the at least one spatial candidate block of the candidate set.

3. The motion estimation method of claim 2, wherein the search direction is from the at least one spatial candidate block of the candidate set to the each respective block wherein only one spatial candidate block of the candidate set is selected.

4. The motion estimation method of claim 2, further comprising:

determining the motion vectors of the blocks of the current frame in the search direction.

5. The motion estimation method of claim 1, wherein one of the at least one spatial candidate block is adjacent to the left edge of the each respective block, and the plurality of temporal candidate blocks are adjacent to the top edge and the bottom edge of the reference block.

6. The motion estimation method of claim 1, wherein one of the at least one spatial candidate block is adjacent to the right edge of the each respective block, and the plurality of temporal candidate blocks are adjacent to the top edge and the bottom edge of the reference block.

7. The motion estimation method of claim 1, wherein one of the at least one spatial candidate block is adjacent to the top edge of the each respective block, and the plurality of temporal candidate blocks are adjacent to the left edge and the right edge of the reference block.

8. The motion estimation method of claim 1, wherein one of the at least one spatial candidate block is adjacent to the bottom edge of the each respective block, and the plurality of temporal candidate blocks are adjacent to the left edge and the right edge of the reference block.

9. The motion estimation method of claim 1, wherein the step of determining the motion vector according to the candidate set for the each respective block of the current frame comprises:

for each of the at least one spatial candidate block and the plurality of temporal candidate blocks, calculating a difference value between the each respective block and a shifted block, wherein the shifted block corresponds to the each respective block and a motion vector of one of the spatial candidate block and the plurality of temporal candidate blocks; and determining the motion vector for the each respective block of the current frame according to the difference values associated with the at least one spatial candidate block and the plurality of temporal candidate blocks.

10. A motion estimator for estimating motion vectors of blocks of a current frame, comprising:

a candidate set generation circuit, for selecting a candidate set associated with the current frame and a previous frame for each respective block of the current frame, wherein the candidate set comprises at least one spatial candidate block in the current frame and a plurality of temporal candidate blocks in the previous frame; and a motion vector determination circuit, for determining a motion vector according to the candidate set for the each respective block of the current frame;

wherein the candidate set generation circuit selects the at least one spatial candidate block directly adjacent to the each respective block from the current frame, wherein the at least one spatial candidate block is located in the same row or column of the current frame as the each respective block, and the candidate set generation circuit selects the plurality of temporal candidate blocks directly adjacent to a reference block from the previous frame, wherein the reference block spatially corresponds to the each respective block in the previous frame, and the plurality of temporal candidate blocks are located in the same row or column of the previous frame as the reference block;

wherein a relationship of the at least one spatial candidate block and the plurality of temporal candidate blocks comprises one of the following:

the at least one spatial candidate block is located in the same row of the current frame as the each respective block, and the plurality of temporal candidate blocks are located in the same column of the previous frame as the reference block without located in the same row of the previous frame as the reference block; and the at least one spatial candidate block is located in the same column of the current frame as the each respective block, and the plurality of temporal candidate blocks are located in the same row of the previous frame as the reference block without located in the same column of the previous frame as the reference block.

11. The motion estimator of claim 10, further comprising:

a search direction generation circuit, for selecting a search direction associated with the each respective block and the at least one spatial candidate block of the candidate set.

12. The motion estimator of claim 11, wherein the search direction is from the at least one spatial candidate block of the candidate set to the each respective block wherein only one spatial candidate block of the candidate set is selected.

13. The motion estimator of claim 11, wherein the motion vector determination circuit determines the motion vectors of the blocks of the current frame in the search direction.

14. The motion estimator of claim 10, wherein one of the at least one spatial candidate block is adjacent to the left edge of the each respective block, and the plurality of temporal candidate blocks are adjacent to the top edge and the bottom edge of the reference block.

15. The motion estimator of claim 10, wherein one of the at least one spatial candidate block is adjacent to the right edge of the each respective block, and the plurality of temporal candidate blocks are adjacent to the top edge and the bottom edge of the reference block.

16. The motion estimator of claim 10, wherein one of the at least one spatial candidate block is adjacent to the top edge of the each respective block, and the plurality of temporal candidate blocks are adjacent to the left edge and the right edge of the reference block.

17. The motion estimator of claim 10, wherein one of the at least one spatial candidate block is adjacent to the bottom edge of the each respective block, and the plurality of temporal candidate blocks are adjacent to the left edge and the right edge of the reference block.

18. The motion estimator of claim 10, wherein the motion vector determination circuit calculates a difference value between the each respective block and a shifted block, wherein the shifted block corresponds to the each respective block and a motion vector of one of the spatial candidate block and the plurality of temporal candidate blocks for each of the at least one spatial candidate block and the plurality of temporal candidate blocks and determines the motion vector for the each respective block of the current frame according to the difference values associated with the at least one spatial candidate block and the plurality of temporal candidate blocks.

\* \* \* \* \*

UNITED STATES PATENT AND TRADEMARK OFFICE
CERTIFICATE OF CORRECTION

PATENT NO. : 10,448,043 B2
APPLICATION NO. : 15/391864
DATED : October 15, 2019
INVENTOR(S) : Pengyuan Hu et al.

Page 1 of 1

It is certified that error appears in the above-identified patent and that said Letters Patent is hereby corrected as shown below:

On the Title Page

Item (72), correct the address (city) of the 4th inventor from "Jianan (CN)" to --Jinan (CN)--.

Signed and Sealed this
Third Day of December, 2019

Andrei Iancu
*Director of the United States Patent and Trademark Office*